May 25, 1965   B. M. HORTON ETAL   3,185,166
FLUID OSCILLATOR
Filed April 8, 1960   13 Sheets-Sheet 1

INVENTORS
BILLY M. HORTON
ROMALD E. BOWLES

May 25, 1965 B. M. HORTON ETAL 3,185,166
FLUID OSCILLATOR
Filed April 8, 1960 13 Sheets-Sheet 2
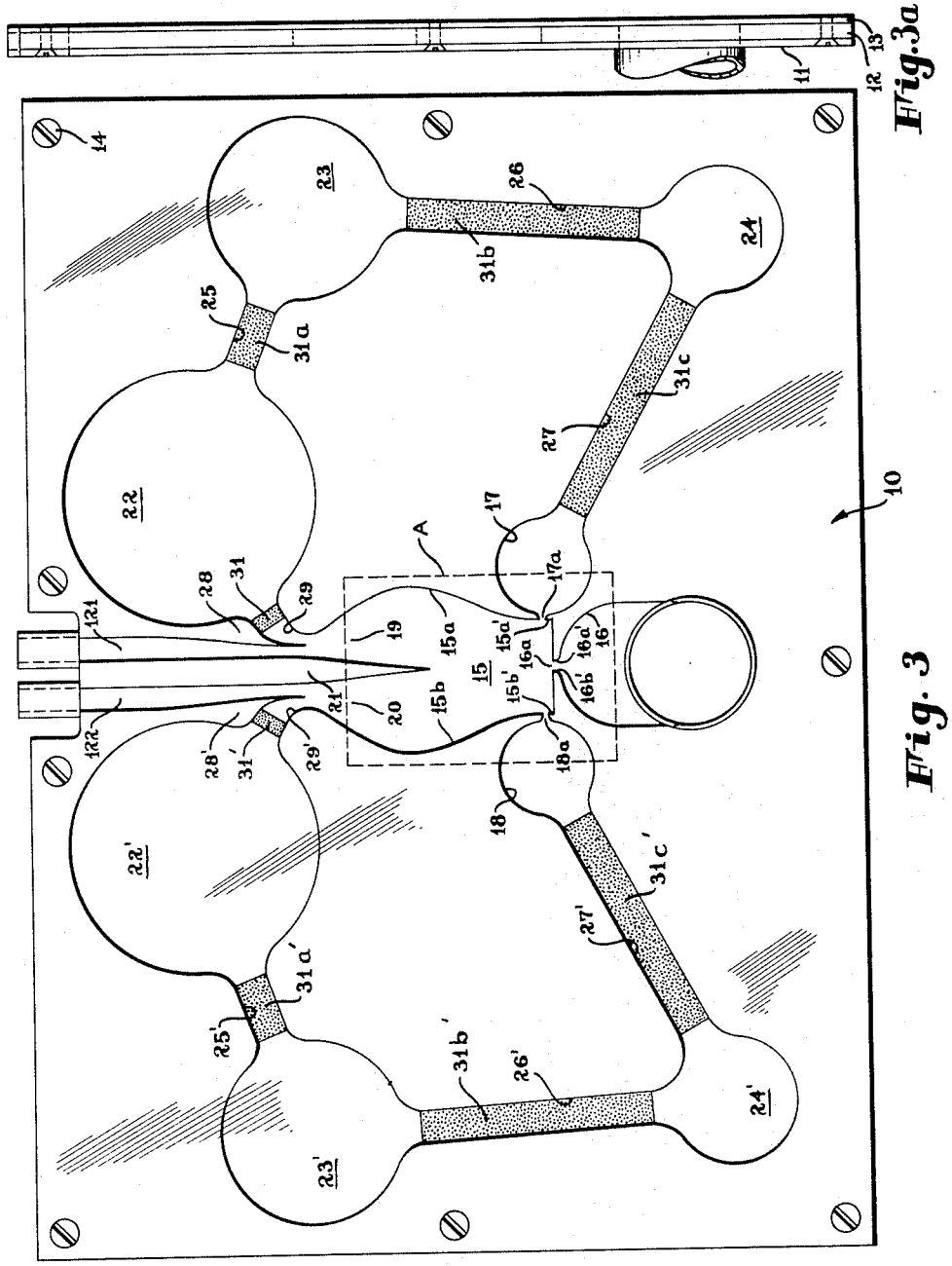
INVENTORS
BILLY M. HORTON
ROMALD E. BOWLES
BY May 25, 1965   B. M. HORTON ETAL   3,185,166
FLUID OSCILLATOR
Filed April 8, 1960   13 Sheets-Sheet 3

INVENTORS
BILLY M. HORTON
ROMALD E. BOWLES
BY

May 25, 1965     B. M. HORTON ETAL     3,185,166
FLUID OSCILLATOR
Filed April 8, 1960     13 Sheets-Sheet 7
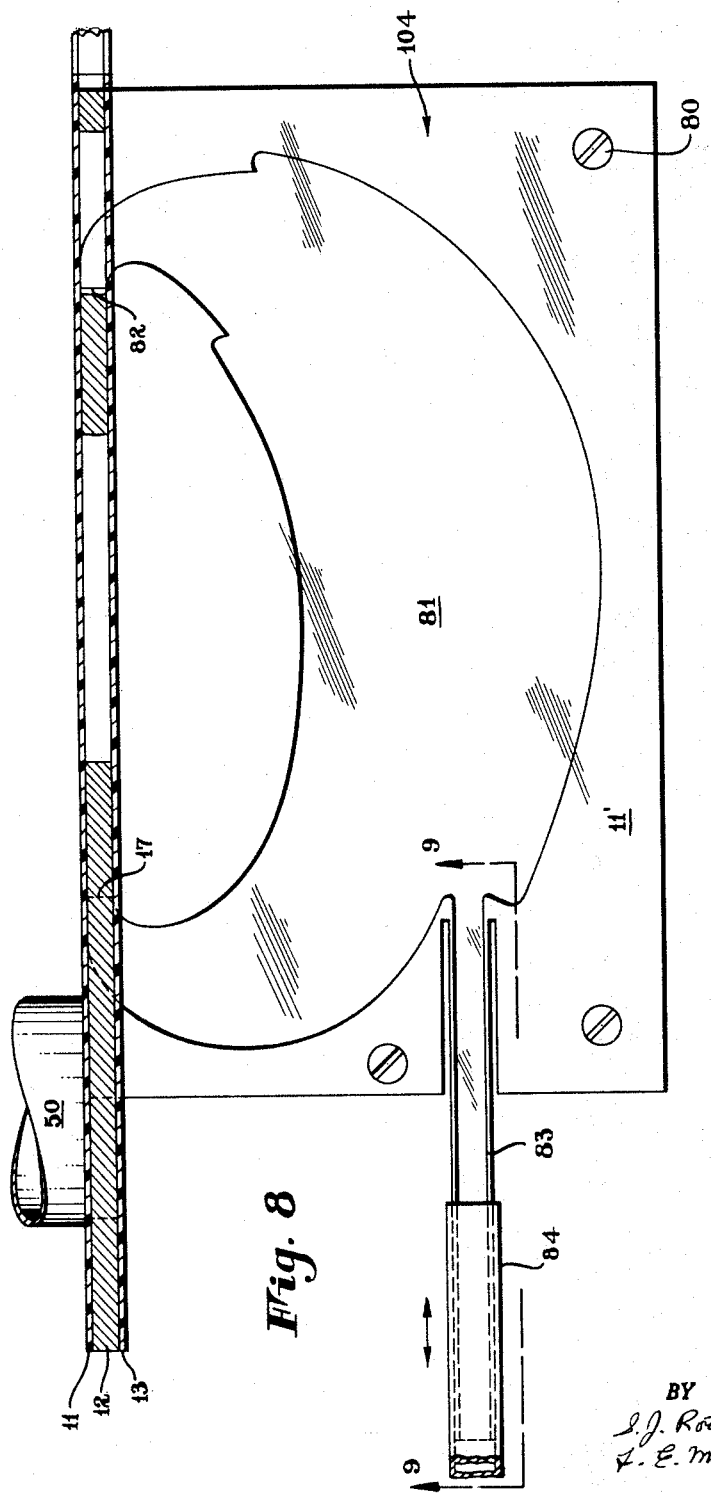
INVENTORS
BILLY M. HORTON
BY ROMALD E. BOWLES May 25, 1965   B. M. HORTON ETAL   3,185,166
FLUID OSCILLATOR Filed April 8, 1960   13 Sheets-Sheet 11

INVENTORS
BILLY M. HORTON
BY ROMALD E. BOWLES

May 25, 1965 B. M. HORTON ETAL 3,185,166
FLUID OSCILLATOR
Filed April 8, 1960 13 Sheets-Sheet 13

INVENTORS
BILLY M. HORTON
ROMALD E. BOWLES
BY

United States Patent Office 3,185,166
Patented May 25, 1965

3,185,166
FLUID OSCILLATOR
Billy M. Horton, 9712 Kensington Parkway, Kensington, Md., and Romald E. Bowles, 12712 Meadowood Drive, Silver Spring, Md.
Filed Apr. 8, 1960, Ser. No. 21,062
38 Claims. (Cl. 137—81.5)
(Granted under Title 35, U.S. Code (1952), sec. 266)

The invention described herein may be manufactured and used by or for the Government for governmental purposes without the payment to us of any royalty thereon.

This invention relates to fluid systems in general, and more specifically to fluid oscillators capable of producing periodically recurring changes in fluid flow.

Fluids in motion are widely used in military and industrial systems. Machine tools, steam engines, internal combustion engines, rocket motors, and many other devices depend upon precise and timely control of moving fluids for proper operation. Application of the theories of pneumatics and hydraulics has led to a wide variety of rugged, reliable, fluid-actuated systems.

These systems generally employ moving elements, such as pistons, valves, diaphragms or vanes, to accomplish their purpose. In many applications the use of moving parts does not prevent the system from operating as intended. However, in other cases a system with moving parts suffers limitations because of friction and wear, thermal expansion, or because of the inertia or weight of these parts. From the viewpoints of reliability, ruggedness and storage life, the elimination of moving parts is desirable.

It was discovered recently that a fluid-operated system having no moving parts other than the fluid could be constructed so as to provide fluid systems in which the proportion of the total energy of a fluid stream delivered to an output orifice or utilization device is controlled by a further fluid stream of lesser total energy. These systems are generally referred to as fluid amplifiers. This invention utilizes such fluid amplifier systems to provide fluid oscillators which are capable of producing a time-varying or oscillating output signal.

Broadly, therefore, it is an object of the present invention to provide a fluid oscillator capable of producing an oscillating output signal.

Another object of the invention is to provide a fluid oscillator which employs a fluid amplifier having no moving parts other than the moving fluid.

Another object of the invention is to utilize the principles of "stream interaction" to provide fluid oscillators which produce oscillating output signals.

Another object of the invention is to utilize the fluid dynamic principles of "boundary layer control" so as to provide fluid oscillators with no moving parts.

Still another object of the invention is to utilize in combination the fluid dynamic principles of "boundary layer control" and "stream interaction" in such a way as to provide fluid oscillators which produce an oscillating output signal.

Another object of the present invention is to provide fluid oscillators employing no moving parts, which oscillators may provide wave trains which are sinusoidal, triangular, square or sawtooth in form.

Still another object of the present invention is to provide a fluid oscillator having no moving parts which employs as essential elements a fluid amplifier, a feedback path and timing means in the feedback including fluid capacitance, inertance or resistance or any combination thereof.

According to this invention, the principles of stream inter-action and boundary layer control are utilized by fluid systems having no moving parts other than the moving fluid in such manner that a fluid stream can be made to oscillate between output tubes at a predetermined frequency. The substantially recurring changes in fluid flow so produced can drive any suitable element or mechanism in an oscillating manner.

Basically, the fluid oscillators of this invention consist of a combination of a fluid amplifier to control fluid flow and provide an energy gain, some means for storing the fluid energy, and a feedback system through which a portion of the stored energy is fed back to the amplifier to control the flow of fluid therefrom with the feedback system providing the desired timing or phase relationship.

The fluid amplifier may be one which utilizes stream-interaction as disclosed in the patent applications of Billy M. Horton entitled "Fluid-Operated System," Serial No. 848,878, filed October 26, 1959, and Serial No. 855,477, filed November 25, 1959, both now abandoned and refiled respectively as continuation-in-part applications Serial No. 51,896 filed September 19, 1960 and now Patent No. 3,122,165 and Serial No. 51,754 filed August 24, 1960. Or the amplifier may utilize boundary layer lock-on control as disclosed in the patent applications of Romald E. Bowles and Raymond W. Warren, Serial No. 855,478, filed November 25, 1959, entitled "Multistable Fluid-Operated System," and Serial No. 4,830, filed January 26, 1960, entitled "Fluid Multistable Memory System," both now abandoned and refiled as a combined continuation-in-part application Serial No. 58,188 filed October 19, 1960.

The referenced patent applications disclosed pure fluid amplifiers which utilize two categories of fluid dynamic control which are referred to as "stream interaction control" and "boundary layer control." Both are generally related as beam deflection type fluid amplifiers. The following description is an aid in understanding some of the control principles involved in these two categories of fluid dynamic control systems.

In a stream interaction system a power nozzle is supplied pressurized fluid and issues a power jet or main stream. A control jet is directed against the side of the power jet and deflects the power jet away from the control jet. If there is no splash or bounce of the fluid streams, momentum is conserved and the power jet will flow at an angle with respect to its original direction wherein the tangent of this angle is a function of the momentum of the control stream and the original momentum of the power jet. Thus it is possible to direct a high power jet to a target area or receiving aperture system using a lower power control stream. This constitutes an amplifier. Addition can be accomplished by use of multiple control streams which deflect the power jet in the same direction. Subtraction can be accomplished by use of control streams which deflect the power jet in opposite directions. Multiplication can be accomplished by controlling the strength of both the power jet and the control streams. Control streams of the same total pressure level can be given different weighting or levels of effectiveness by providing the control stream nozzles with suitable relative cross-sectional areas. Algebraic equations can be solved by fluid amplifiers of this type which have suitable arrangements of control stream nozzles wherein each control stream flow is varied in accordance with a separate individual variable.

In boundary layer control fluid amplifiers a high energy power jet is directed towards a target area or receiving aperture system by the pressure distribution in the power jet boundary layer region. This pressure distribution is controlled by the wall configuration of the interaction chamber, the power jet energy level, the fluid transport characteristics, the back-loading of the amplifier outputs, and the flow of control fluid to the power jet boundary layer region. Whereas side walls are not essential for a stream interaction type fluid amplifier, a boundary layer control fluid amplifier generally uses the side walls for deflection of the power jet. In a boundary layer control fluid amplifier special design of the interaction chamber configuration permits designs wherein the power jet will lock-on to one side wall and remain in the locked-on flow configuration without a control fluid flow. When the power jet is suitably deflected by a control fluid flow it can lock-on to the opposite side wall and remain in the locked-on flow configuration even after the control fluid flow is stopped. Thus this unit possesses positive feedback however the feedback path is created and destroyed each time the power jet is deflected to another position. The feedback path is a flow pattern within the interaction chamber governed by the chamber configuration and the power jet flow.

The fluid amplifiers disclosed in the aforementioned patent applications control the delivery of energy of a main stream of fluid to an outlet orifice or utilization device by means of control fluid flow issuing from a control nozzle generally at right angles to the main stream. The proportion of the relatively high energy main stream delivered to an orifice may be varied as a linear or non-linear function of the relatively low energy of a control stream interacting therewith. Since the energy controlled is larger than the control energy supplied, an energy gain is realized and amplification in the conventional sense is realized. Such amplifiers require no moving parts other than the fluid flow therein and consequently have a frequency response considerably higher than prior art fluid systems which employ moving parts. Obviously the higher the frequency response of the amplifiers employed in the oscillators of the present invention the higher the frequencies of oscillation which may be realized. In prior art pneumatic systems, for instance, the upper frequency response is about 60 c.p.s., while in the systems of the present invention responses of at least 1000 c.p.s. may be realized. Other types of fluid amplifiers having no moving parts may also be used.

Fluid oscillators, as stated above, require in addition to amplifiers some means for storing energy. The oscillators of this invention store fluid energy in two forms, potential energy and kinetic energy. Potential energy is energy associated with a "fluid capacitance." The term "fluid capacitance," as used hereafter, is defined as that class of fluid energy storage means which stores fluid potential energy. In general the energy stored in a fluid capacitance increases as a result of introduction of additional fluid therein. Fluid capacitance may take one or more of the following forms: compression of the fluid to a greater density, change of thermodynamic state of the fluid, change of elevation of the fluid, change of fluid internal energy level, compression of a second fluid separated from the first fluid by a flexible wall, compression of a second fluid in contact with the first fluid, deformation of elastic walls which restrain the fluid, change of elevation of the fluid, change of elevation of a weight supported by the fluid, and compression of bubbles or droplets of one fluid entrained in another. Fluids in motion have a kinetic energy which represents a second form of stored energy. The method of storing energy in this form is to accelerate the fluid to a higher speed. Fluid inertance is a measure of the pressure required to accelerate a mass of a fluid in a passageway. Fluid inertance is associated with fluid flow through a tube.

The term "fluid" includes compressible as well as incompressible fluids, fluid mixtures and fluid combinations. When compressible fluids are used the fluid energy storage means need not be resilient or expansible, but may be made of rigid metal or plastic or any other rigid material. If the fluid is incompressible then the fluid storage means should be made elastically deformable or should have a free surface such as water in a reservoir. A pressure-loaded flexible diaphragm can be provided in a fluid capacitance if it is not feasible to provide an elastically deformable container, reservoir or tank. A loaded piston is one type of elastically deformable tank.

The term "input signal" as used herein is the fluid signal which is intentionally supplied to the oscillator for the purpose of instructing or commanding the oscillator to provide a desired output signal. The term "output signal" used herein is the fluid signal which is produced by the oscillator at its output. The input and output signals can be in the form of time or spatial variations in pressure, density, flow velocity, mass flow rate, fluid composition, transport properties, or other thermodynamic properties of the input fluid individually or in combination thereof.

The specific nature of the invention, as well as other objects, uses, and advantages thereof, will clearly appear from the following description and from the accompanying drawings, in which:

FIG. 1 graphically illustrates a symmetrical fluid waveform or output signal which can be produced by this invention.

FIG. 3 is a plan view of one embodiment of a fluid oscillator constructed in accordance with this invention.

FIG. 3a is a side view of the oscillator shown in FIG. 3.

FIG. 5a is a side view of the oscillator shown in FIG. 5.

FIG. 6a is a side view of the oscillator shown in FIG. 6.

FIG. 8 is a sectional side view of FIG. 7 taken through section lines 8—8.

FIG. 9 is a sectional end view taken through section lines 9—9 of FIG. 8.

FIG. 13 illustrates an output signal produced by the oscillator shown in FIGS. 12 and 12a.

Figures 12A, 16:
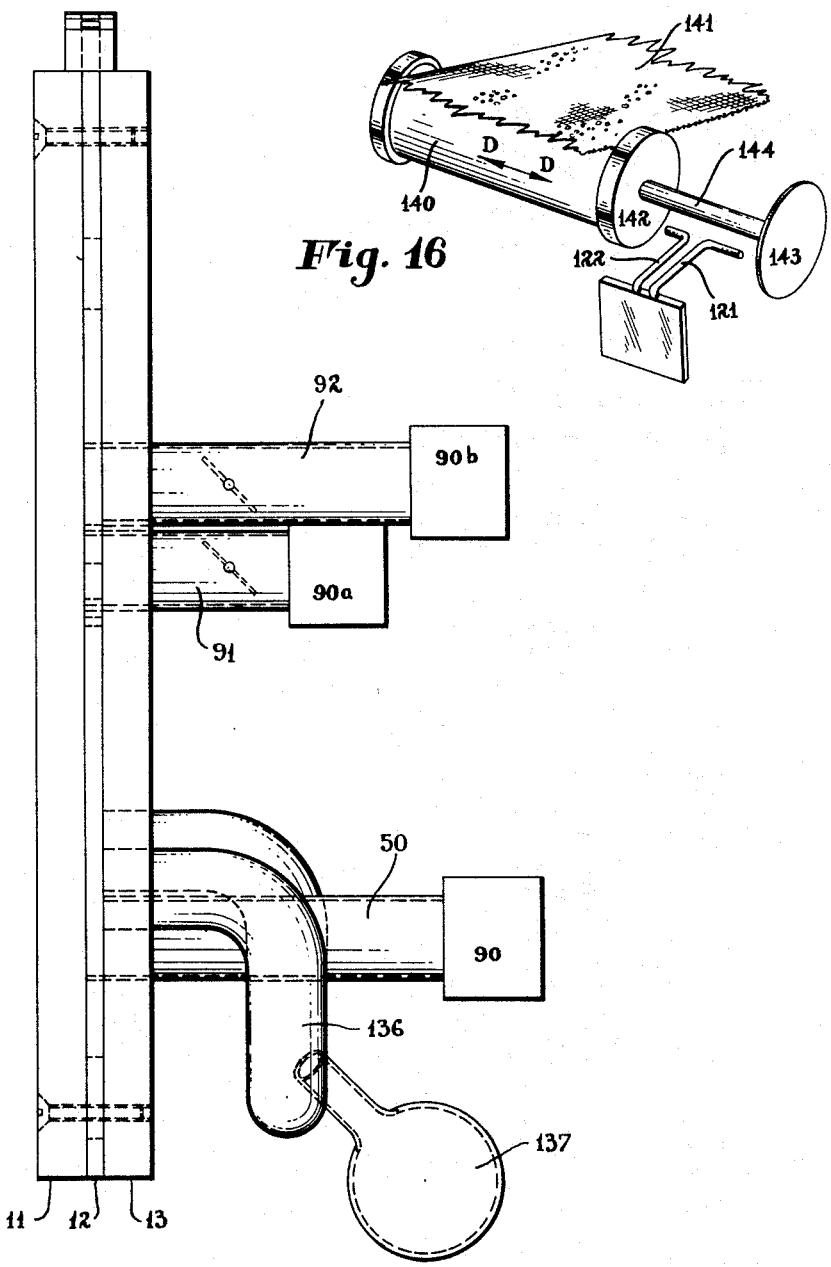
FIG. 12a is a side view of the oscillator shown in FIG. 12.

FIG. 16 schematically illustrates how an oscillator constructed in accordance with this invention can oscillate other apparatus such as a foraminous belt.

In the figures, in general, like elements are referred to by like numerals.

Referring now to FIG. 3, for a more complete understanding of the invention there is shown one embodiment of a fluid oscillator 10. Fluid oscillator 10 consists of a fluid amplifier, fluid energy storage means, and means to feed back a portion of the fluid from the amplifier in suitable phase so as to appropriately deflect the main fluid stream flowing through the amplifier.

Oscillator 10 is formed by three flat plates 11, 12 and 13, respectively (FIG. 3a). Plate 12 is tightly held between plates 11 and 13 by machine screws 14. It should be evident that other means, such as adhesives, may also be used to hold the plates together. For purposes of illustration, plates 11, 12 and 13 are shown as composed of a clear plastic material. Plate 12 is formed to provide between plates 11 and 13 the elements which comprise the oscillator 10.

Chamber 15, fluid power nozzle 16, orifice 16a, a pair of opposed control nozzles 17 and 18, orifices 17a and 18a, respectively, the leading edge of fluid flow divider 21, and apertures 19 and 20 encompassed by the phantom lines form amplifier A.

Amplifier A may be of the boundary layer control type in which case edges 15a' and 15b' formed by the bottoms of opposite walls 15a and 15b, respectively, of chamber 15 are set back from either side of edges 16a' and 16b' formed by power orifice 16a a limited amount in accordance with the aforementioned patent applications of Romald E. Bowles and Raymond W. Warren. Because the walls 15a and 15b are set back from the power orifice 16a, when fluid issues from nozzle 16 a region of fluid moving at a significantly lower speed than the main stream is created along walls 15a and 15b. This region along either wall 15a or 15b is known in the art as an "artificial boundary region" and is essentially a region of reduced pressure. The effect of this region is to cause the main fluid stream from power nozzle 16 to bend towards and "lock-on" to either chamber wall 15a or 15b. If fluid flow is introduced from some suitable source, such as control nozzle 17 or 18, into this region between the main fluid stream and the closest chamber wall, the effect will be to raise the pressure in the boundary layer region and reduce or nullify the lock-on effect produced by the artificial boundary region. The control nozzle fluid flow will deflect the main fluid stream towards that chamber wall which is opposite the wall which the fluid initially locked-on to. This feature provides controlled switching of the main fluid stream from one output aperture 19 to the other output aperture 20, and is disclosed in the aforementioned patent applications of Romald E. Bowles and Raymond W. Warren.

Alternately, amplifier A may be of the stream interaction type disclosed in the aforementioned patent applications of Billy M. Horton. In this type of amplifier, amplification is effected because a fluid stream having a relatively small amount of energy interacts with and deflects a main fluid stream having considerable energy so that the main fluid stream can be directed to deliver its energy in whole or in part to a desired aperture or aperture combination. In such a case the walls of chamber 15 can be remote from the fluid stream issuing from the supply nozzle 16, because the side wall pressure distribution is not essential for operation of this type of fluid amplifier.

Figure 1:
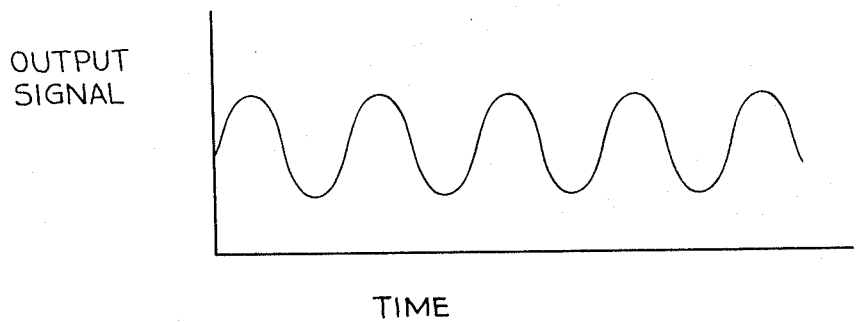
Figure 2:
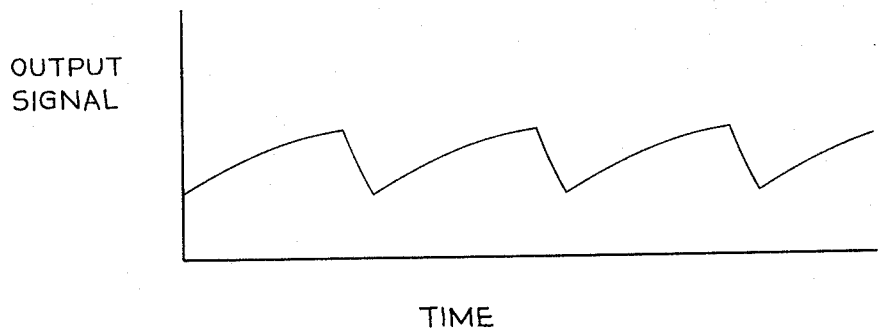
FIG. 2 is a graphical illustration of an asymmetrical fluid waveform or output signal which can be produced by this invention.

Fluid capacitance is utilized in this fluid oscillator embodiment and consists of three pairs of tanks positioned on either side of chamber 15. It is apparent to one skilled in the art that other types of fluid capacitors can be used in place of these tanks. These pairs of tanks are referred to by numerals 22, 22', 23, 23', 24 and 24'. The two tanks comprising a pair should have substantially the same volume when a symmetrical output signal is desired (FIG. 1). Each tank serves as a fluid capacitance which stores fluid in a substantially static state so that the fluid potential energy stored in the tanks increases as the result of the introduction of additional fluid. These tanks are interconnected by means of tubes 25, 25', 26 and 26' which together with tubes 27, 27', 29 and 29' provide a path for feeding back a portion of the fluid stream issuing from amplifier A to the control nozzles 17 and 18. Flow dividers 28 and 28' are also provided and serve to direct a predetermined portion of the fluid stream flowing into apertures 19 and 20 into the tubes 29 and 29', respectively. The remaining portion of the main fluid stream flows into the associated output tube 121 or 122 and serves as the fluid oscillator output signal.

Supply nozzle 16 communicates with a source of fluid under pressure (not shown). As will be apparent to those skilled in the art, this source may be a pressurized tank of fluid or any other suitable source of pressurized fluid. Fluid resistances, designated by numeral 31, are provided and may take the form of porous plugs. The fluid resistance of these plugs and the values of capacitances 22, 23, 24, 17, 22', 23' and 24' can be related, as will be evident, to insure that the fluid fed back to amplifier A from tubes 27 and 27' has the proper phase to sustain oscillation.

Divider 21 can be positioned asymmetrically with respect to orifice 16a so that a greater portion of the fluid flowing initially into chamber 15 is diverted by divider 21 into one of the apertures 19 or 20. The divider 21 does not have to be asymmetrically positioned however because any disturbance of the fluid flow pattern through amplifier A is usually sufficient to initiate oscillation.

When the main fluid flow is asymmetric, divider 28 or 28' will divert an increased portion of the fluid stream into associated tube 29 or 29' and thereafter into the associated feedback path and energy storage means which communicates with that tube. As more fluid flows into the tube 29 or 29', a pressure build-up in the fluid capacitances 22, 23 and 24 or 22', 23' and 24' occurs until the fluid issues from control nozzles 17 or 18, respectively. That control nozzle issuing the greatest quantity of fluid because more fluid initially enters one aperture 19 or 20 than the other, will cause deflection of the main fluid stream towards and into an opposite aperture 20 or 19. If amplifier A is of the boundary layer control type mentioned above, deflection of the main stream occurs when fluid issues from the control nozzles and increases pressure in the boundary layer between the main fluid stream and the chamber wall. The boundary layer pressures on walls 15a and 15b are unequal and the main stream is deflected by that control nozzle which issues the greatest quantity of fluid. For example, should control nozzle 17 issue a greater quantity of fluid than nozzle 18, aperture 20 will receive substantially the entire main fluid stream because the stream will lock-on wall 15b. Tanks 22', 23' and 24' will thereupon receive fluid and a pressure build-up will occur in the tanks until control nozzle 18 issues fluid into the boundary layer region between the main stream and chamber wall 15b. During this interval, fluid flows from output tube 122. As a result of fluid issuing from nozzle 18, the main fluid stream will be deflected towards wall 15a and the entire flow will enter aperture 19 and flow from output tube 121 is increased. After a predetermined time interval elapses, the length of the interval depending upon the values of the fluid capacitances, and the resistance of the porous plugs and the volume of liquid issuing from amplifier A, the stream will be again deflected towards chamber wall 15b. Deflection of the main fluid stream from one chamber wall to the other causes the stream to issue from output tubes 121 and 122 in an oscillating manner. Amplifier A may also be of the stream interaction type referred to above.

It is apparent to one skilled in the art that when there is flow to aperture 19 the porous plug 31 controls the rate of pressure build-up in capacitance 22 and provides a time delay or phase shift. The combination of fluid capacitance 23 and the fluid resistances 31 and 31a controls the rate of pressure build-up in capacitance 23 and provides a further phase shift. Capacitance 24 in combination with porous plug 31b provides still more phase shift for pressure build-up in capacitance 24. The capacitance of nozzle 17 in combination with porous plug 31c provides a further delay or phase shift for pressure build-up in nozzle 17. Similarly, capacitances 22', 23' and 24' and the capacitance of nozzle 18 and the fluid resistances of porous plugs 31', 31a', 31b' and 31c' provide a phase shift or time delay of pressure build-up in nozzle 18 when there is flow to aperture 20. This phase shift controls the oscillator's frequency of oscillation.

Figure 4A:
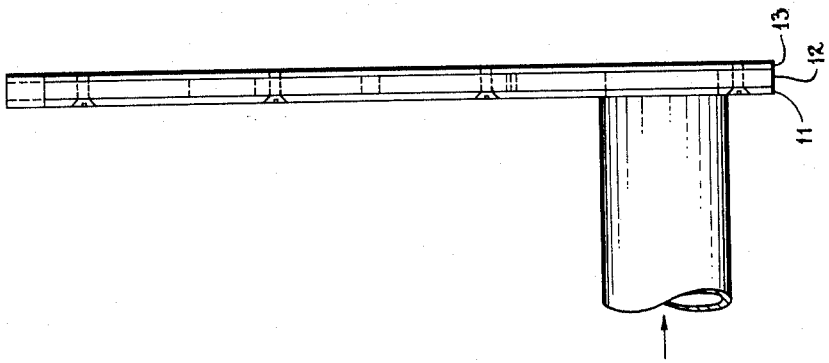
FIG. 4a is a side view of the oscillator shown in FIG. 4.
Figure 4:
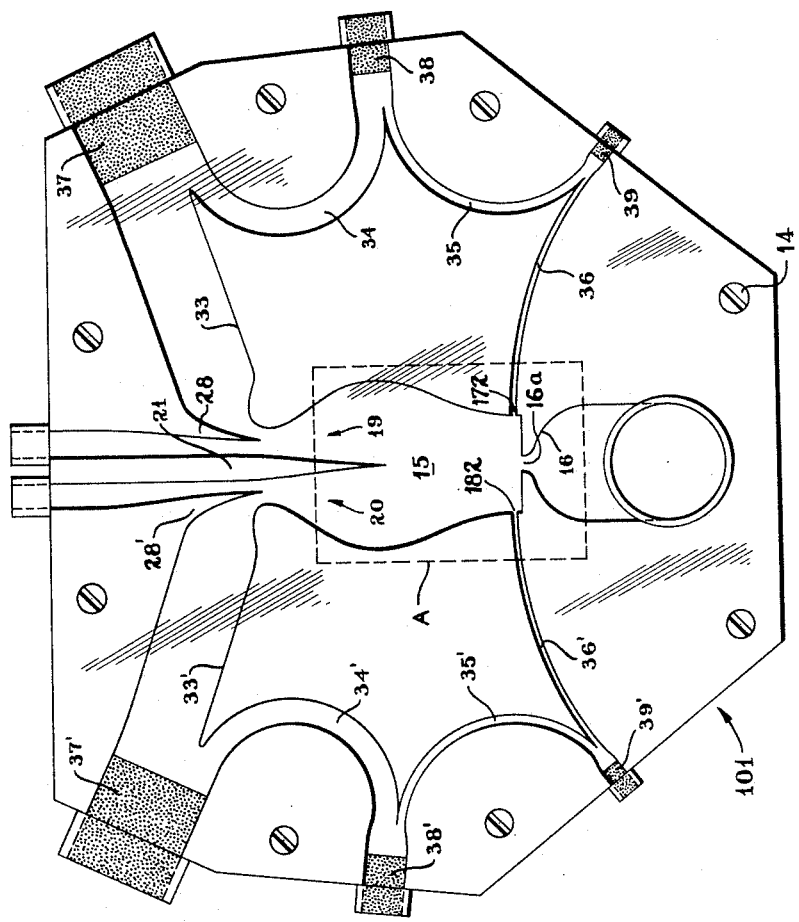
FIG. 4 is a plan view of another embodiment of a fluid oscillator constructed in accordance with this invention.

FIG. 4 illustrates another embodiment of a fluid oscillator 101 in which eight suitably connected tubes 33, 33', 34, 34', 35, 35', 36 and 36' comprise the energy storage means. Oscillator 101 differs from the oscillator 10 described above in that the energy storage means is a fluid inertance, rather than a fluid capacitance, and that the usual control nozzles are formed by the ends of feedback tubes 36 and 36', respectively, as shown. Thus, the fluid received from the amplifier A and flowing through the tubes stores kinetic energy which is fed through feedback tubes 36 and 36' to the amplifier A. Pairs of porous plugs 37, 37', 38, 38', 39 and 39' are provided at the junctions of tubes 33, 33', 34, 34' 35 and 35' and act as fluid resistors between the feedback path local total pressure and the ambient or sump pressure. Thus when there is flow from nozzle 16 to aperture 19, the inertance of fluid in tube 33 cooperatively with fluid resistance 37 provides a phase shift just as does inertance 34 with resistance 38 and inertance 35 with resistance 39 and inertance 36. The phase shift so provided controls the time at which control energy is released at the chamber 15 end of inertance 36 so as to deflect the jet (issuing from nozzle 16) towards aperture 20.

Assuming the power nozzle 16 issues a main fluid stream from some suitable source of compressed fluid (not shown), oscillator 101 will initiate oscillation at a frequency predominantly dependent upon the phase shift of the feedback path which establishes the time of release of control energy which has been stored in the feedback path. Any normal disturbance of the main fluid stream will cause more fluid to flow into one or the other of apertures 19 and 20 and so initiate oscillation.

Phasing is accomplished by the four pairs of tubes 33, 33', 34, 34', 35, 35', 36 and 36'. The main fluid stream will be deflected by fluid issuing from that feedback tube which at that instant issues the greatest control signal flow and will continue until a greater control flow issues from the opposite feedback tube which then causes the main fluid stream to deflect back again. Either of the two types of fluid amplifier previously described are suitable for use as amplifier A of this fluid-actuated oscillator.

Figure 5:
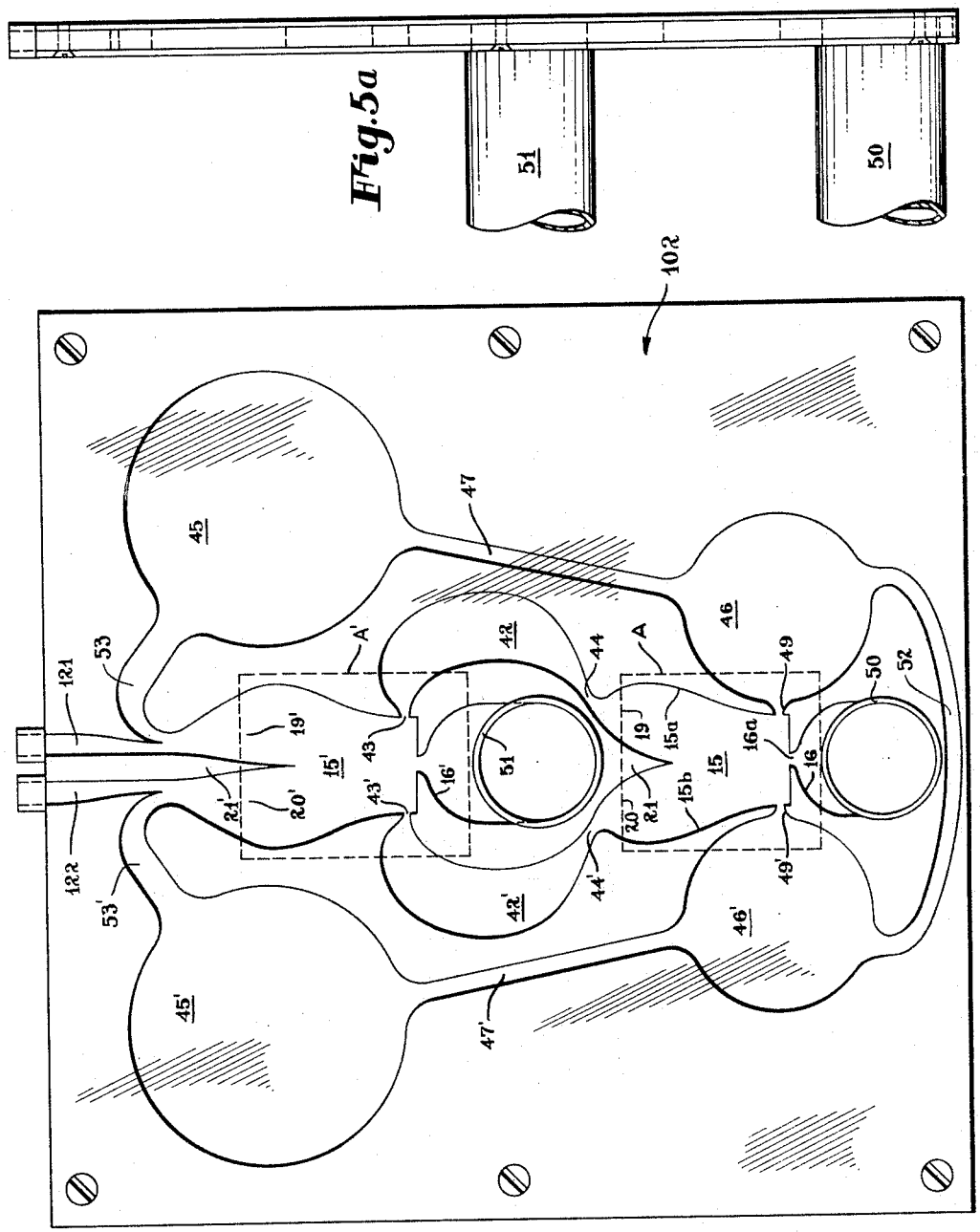
FIG. 5 is a plan view of another embodiment of a fluid oscillator constructed in accordance with this invention.

FIGS. 5 and 5a illustrate another embodiment of a fluid oscillator referred to by numeral 102, in which the oscillating fluid output signal from amplifier A is fed to amplifier A' and so amplified again. As shown in FIG. 5, amplifier A' receives fluid from amplifier A by means of a pair of nozzle-shaped reservoirs 42 and 42' having constricted orifices 43 and 43', respectively, communicating with chamber 15'. The other ends of reservoirs 42 and 42' are necked down to provide constrictions 44 and 44'. Fluid capacitances formed by tanks 45 and 46 are connected by inertance tube 47. Capacitances 45' and 46' are connected by inertance tube 47'. Tanks 46 and 46' have nozzles 49 and 49' which communicate with chamber 15. Inertance tube 52 connects tanks 46 and 46'. Tubes 50 and 51 (FIG. 5a) are provided to feed an input signal to amplifiers A and A', respectively, from any suitable source of pressurized fluid (not shown). A single source of pressurized fluid may be used to supply both tubes 50 and 51 or separate sources may be used to supply each tube individually. Amplifiers A and A' are preferably of the stream interaction type previously described, but other fluid amplifiers can be used.

When fluid issues from nozzle 16, the fluid flow pattern will possess some asymmetry and, consequently, more fluid will initially flow from the power nozzle 16 into one of the apertures 19 and 20 and, hence, into reservoir 42 and 42'. Orifice 16a of power nozzle 16 can be symmetrically positioned relative to the centerline of chamber 15 so that the fluid flow pattern from amplifier A is substantially equally split by divider 21 and remains so until a disturbance causes more fluid to flow into one aperture than the other. Also, orifice 16a may be asymmetrically positioned relative to the centerline of chamber 15 so that there is a bias which encourages more fluid flow into one aperture, 19 or 20, than into the other aperture, 20 or 19. Reservoirs 42, 42' and tanks 45, 45', 46 and 46' form fluid capacitances and periodically store and release fluid potential energy, as previously described. Tubes or inertances 53, 53', 47, 47' and 52 periodically store and release kinetic energy, as previously described. Fluid entering either aperture 19 or 20 will be received by the associated reservoir which will issue the fluid through nozzle 43 or 43' after a phase shift or delay associated with the time required for pressure build-up therein. This fluid flow from nozzle 43 and 43' will deflect the fluid stream issuing from power nozzle 16' into either aperture 20' or 19', respectively.

If for an interval of time, reservoir 42 receives a greater quantity of fluid than does reservoir 42' as a result of asymmetrical flow of fluid issuing from nozzle 16 through chamber 15, nozzle 43 will thereupon issue a greater quantity of fluid into chamber 15' thereby deflecting the fluid stream from power nozzle 16' into aperture 20' and, hence, into both inertance 53' and output tube 122. Initially, the kinetic energy of the fluid stream issuing from nozzle 43 will not be sufficient to completely deflect the fluid stream from power nozzle 16' through inertance 53' into tank 45', and therefore some of the fluid will also flow into inertance 53 and output tube 121. As the pressure within tank 45' builds up, it starts to increase the rate of fluid flow through inertance 47' into tank 46'. However, the inertia of fluid in inertance 47' delays this flow increase and produces a phase shift. Once maximum flow rate is established, the flow rate through inertance 47' depends upon the pressure difference between tanks 45' and 46' and the flow resistance associated with fluid flow through inertance 47'. However, if the difference of pressure between tanks 45' and 46' decreases, the inertia of fluid in inertance 47' acts as a source of energy which tends to maintain the rate of flow from tank 45' into tank 46'. Thus the inertance 47' influences the phase relationship between flow from inertance 53' into tank 45' and flow from inertance 47' into tank 46. As pressure builds up in tank 46', it will issue fluid through nozzle 49' into chamber 15. If flow from nozzle 49' exceeds the flow from nozzle 49, it will deflect the main fluid stream issuing from power nozzle 16 towards aperture 19. Simultaneously, while the pressure in tank 46' is greater than that in tank 46, there will be an acceleration of the fluid in inertance 52 towards tank 46. The inertia of fluid in inertance 52 delays the build-up of this flow between tank 46' and tank 46. The fluid in inertance 52 will flow at an increasing rate from tank 46' to tank 46 so long as the pressure difference between these tanks is sufficient to overcome the fluid resistance of inertance 52. Thus the maximum flow rate through inertance 52 will occur after the maximum pressure difference between tanks 46' and 46. Thus it is able to transfer energy from tank 46' to tank 46, and vice versa, and it accomplishes the transfer by means of the kinetic energy of the fluid which flows through the inertance in an oscillating manner. As was previously mentioned, flow to aperture 19 supplies fluid to restriction 44, tank 42 and nozzle 43 so as to deflect the power stream of nozzle 16' towards aperture 20' thereby supplying fluid to inertance 53'. There is a phase shift between the time energy is released at nozzle 49' and the time energy is furnished tank 46' via the feedback path as the result of the energy release by nozzle 49'.

The cross-sectional area of inertance 52 is larger than the cross-sectional area of nozzle 49 and 49' so that the resistance of inertance 52 is sufficiently low that it can provide a flow to tank 46 from tank 46' such that only a small flow into tank 46 from inertance 47 is sufficient to cause control flow from nozzle 49 to override control flow from nozzle 49' and deflect the power jet of nozzle 16 towards aperture 20 which supplies restriction 44', reservoir 42' and control nozzle 43'. Deflection of the power jet of nozzle 16' towards aperture 19' causes flow into output tube 121. A portion of the jet will also flow through inertance 53. The feedback path 45, 47, 46, 49 and 52 acts as an energy storage means and a controller which regulates the phase or time of flow of fluid from control nozzle 49 and through inertance 52 to tank 46' and control nozzle 49'.

The time of oscillation will depend upon the energy level and rate at which fluid is supplied to the power nozzles, the size of the oscillator and the values of the fluid capacitances, the fluid resistances, and the inertances. As will be evident from the foregoing, fluid is supplied to tank 46 through inertances 47 and 52. Fluid inertances 47 and 52 together with tank 46 resonate at some predetermined frequency determined by the size of the various elements. The resonance so produced causes the pressure in tank 46 to reach a higher value than that in tank 46'. When the oscillator configuration is symmetrical, a symmetrical waveform, such as shown in FIG. 1, will be produced by fluid issuing from tubes 121 and 122. When the oscillator configuration is not symmetrical, an asymmetrical waveform can be produced.

Figure 6:
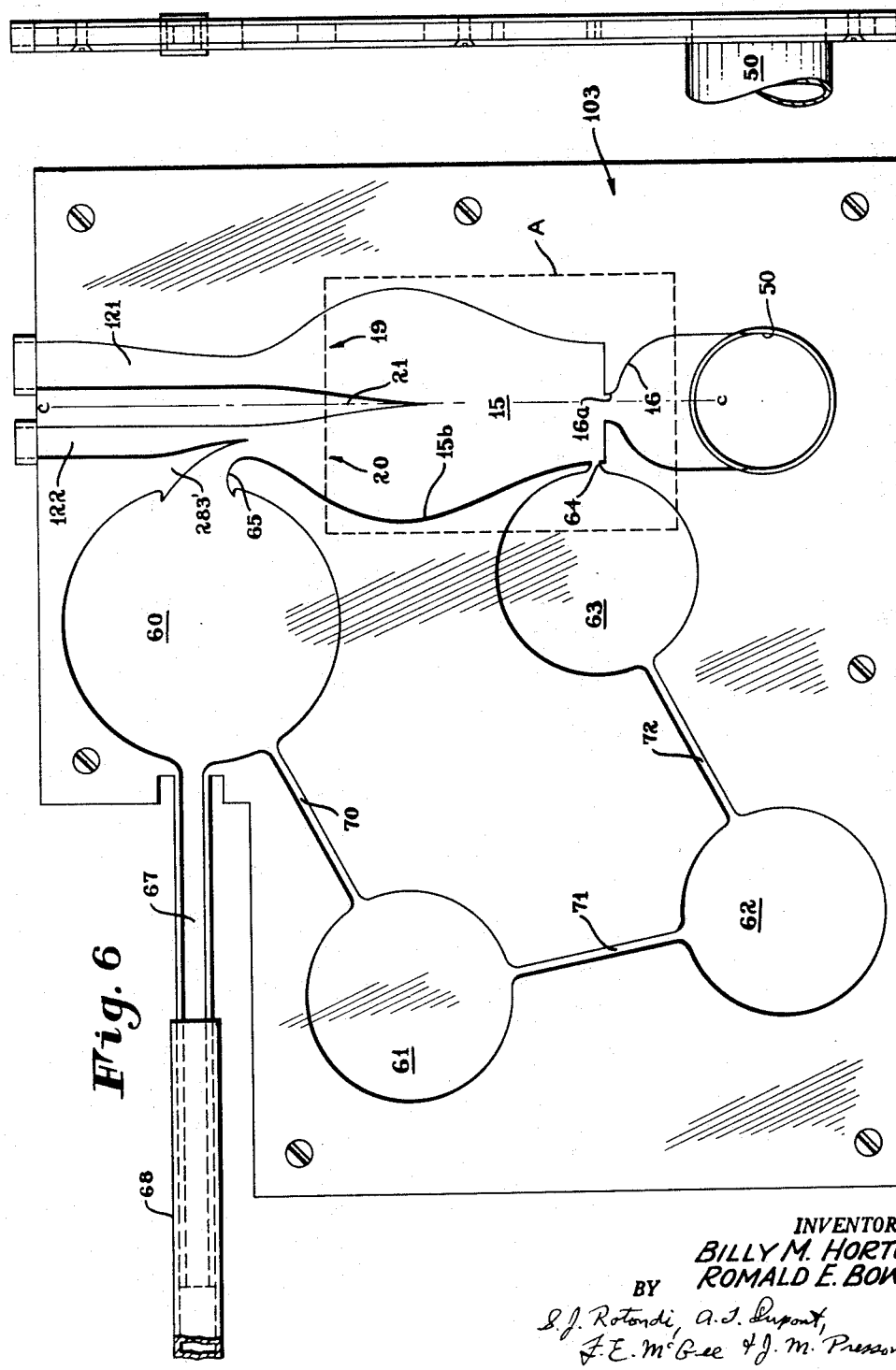
FIG. 6 is a plan view of another embodiment of a fluid oscillator constructed in accordance with this invention.

FIG. 6 illustrates a single-sided fluid oscillator 103, so caled because the fluid feedback passageway system operates only on one side of the amplifier A. In oscillator 103 four tanks 60, 61, 62 and 63 serve as fluid capacitances. Tubes 65, 67, 68, 70, 71 and 72 serve as fluid inertances. Tank 60 communicates with amplifier A through tube 65, one side of which is formed by divider 283'. A hollow rectangular tube 67 communicates with tank 60 and a hollow rectangular sleeve 68 is slidable on this tube so that the tube overall length is adjustable. Tubes 67 and 68 connect capacitance 60 with the sump or ambient pressure which is lower than the maximum total pressure available at tube 65 during operation.

Additional inertances, designated by numerals 70, 71 and 72, connect the fluid capacitances together in series. Tank 63 is formed with a nozzle 64 which communicates with the chamber 15 through wall 15b of amplifier A. Orifice 16a is positioned asymmetrically with respect to the centerline C—C of chamber 15 so that a substantial portion of the fluid from nozzle 16 flows initially into aperture 20. Divider 283' can be positioned so that it will capture or scoop up a portion of fluid flowing into aperture 20 and divert this fluid to tube 65. A fluid pressure build-up will occur in tank 60. As the pressure in this tank increases, tubes 70, 71 and 72 will supply fluid to tanks 61, 62 and 63 in the following manner.

When pressure in tank 60 is greater than that in tank 61, this pressure difference will accelerate fluid in inertance 70 towards tank 61 until the fluid flow resistance of 70 provides a back pressure equal to the difference in the tank pressures. The above acceleration of fluid in inertance 70 results in a lag in build-up of pressure in tank 61 as compared with pressure change in tank 60. When the pressure difference between tanks 60 and 61 is too low to maintain the rate of flow of fluid in inertance 70, the inertia of fluid in inertance 70 uses some of its kinetic energy to maintain a higher flow rate than is commensurate with the pressure difference and flow resistance across inertance 70. Thus, the outflow from 60 is initially less than and subsequently more than the steady state flow rate based on resistance of 70. Similarly, flow through inertances 67 and 68 depends upon the time variation of the difference between the pressure in tank 60 and the outlet pressure of 68 which is the ambient or sump pressure. Similarly, flow in inertance 71 depends upon the time variation of pressure difference between tanks 61 and 62, and the flow in inertance 72 depends upon the time variation of pressure difference between tanks 62 and 63.

These fluid capacitances and inertances, together with their flow resistance and orifice 64, act as an energy storage means and feedback path providing a phase shift which times the release of control fluid at orifice 64 so as to periodically deflect the power jet of nozzle 16 towards aperture 19 and output 121, thus diminishing the flow of fluid to aperture 20, output 122 and tube 65.

When tank 60 attains or approaches its maximum pressure buildup as a result of fluid being fed thereto from the power nozzle, the fluid inertance of fluid flowing through tube 67 will bleed off the fluid in tank 60 until the pressure in that tank is below that of tank 61. Thus, tank 60 will be unable to supply additional fluid to tank 61. In turn, tank 61 will stop supplying fluid to tank 62, and tank 62 will stop supplying fluid to tank 63. Tank 63 will discharge itself and will thereupon be unable to continue to issue a control stream of fluid and the power jet of nozzle 16 will return to aperture 20 thereby once again building up pressure in tank 60. After a predetermined time elapses, depending upon the values of the fluid capacitances and the fluid inertances, tank 63 will again issue a deflecting stream so that the main fluid stream is deflected from aperture 20 to aperture 19 and thusly from tube 122 to tube 121. By suitably positioning orifice 16a, it is possible to obtain a symmetrical waveform, such as shown in FIG. 1, from oscillator 103. It is also possible to position orifice 16a so as to obtain an asymmetrical waveform from oscillator 103, as should be apparent.

Nozzle 16 is supplied pressurized fluid through tube 50 which is shown in FIG. 6a.

Sleeve 68 can be slid along tube 67, thereby increasing or decreasing the effective length of the fluid inertance. By increasing or decreasing the length of the tube 68–67, oscillator 103 can be tuned for oscillation at its predetermined frequency.

Figure 7:
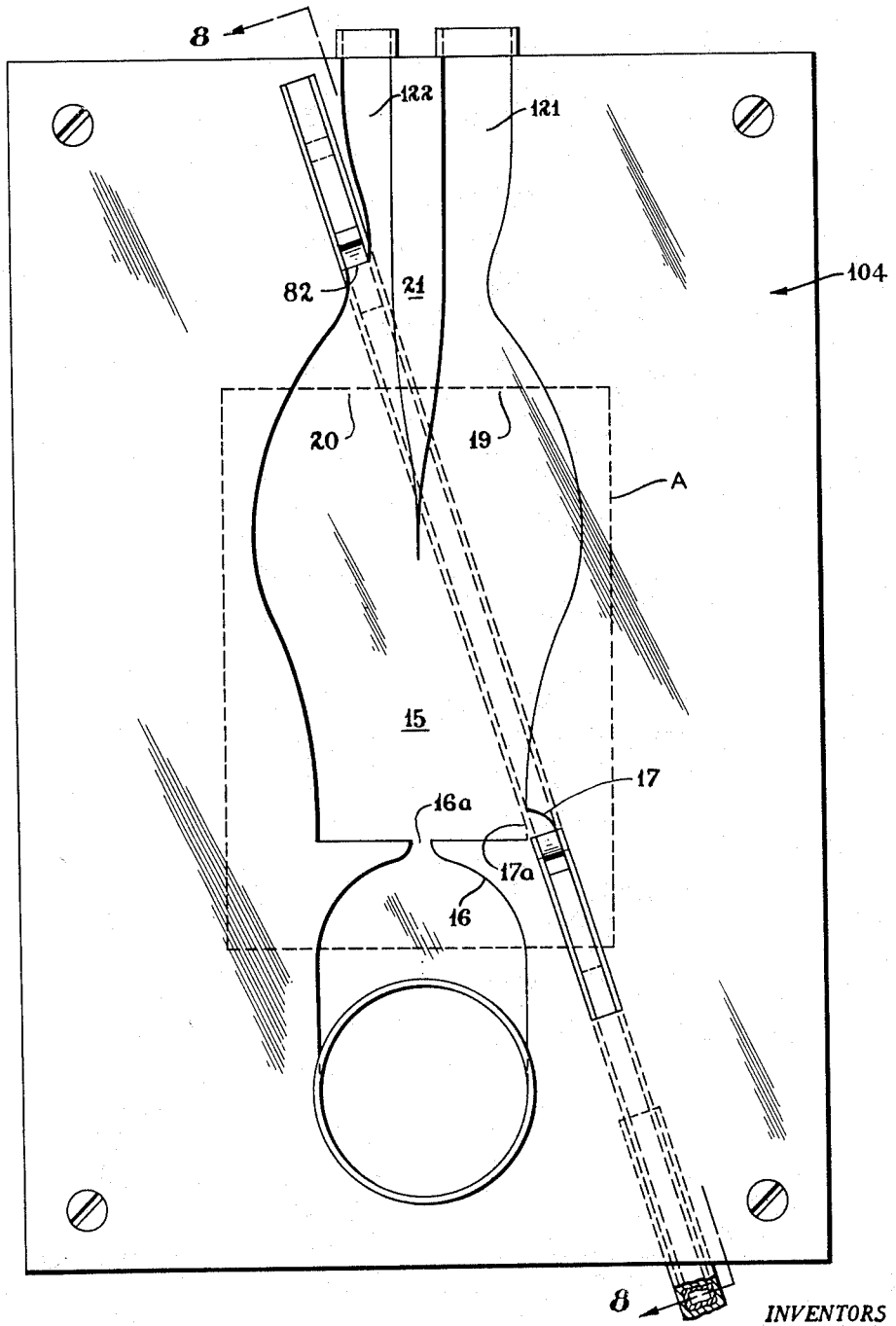
FIG. 7 is a plan view of another embodiment of a fluid oscillator constructed in accordance with this invention.

FIGS. 7, 8 and 9 illustrate another embodiment of the fluid oscillator designated by numeral 104. Oscillator 104 is formed by two sets of plates 11, 12 and 13 (FIG. 8) and 11', 12' and 13' (FIG. 9), respectively, which are at right angles and fixed to one another in this position by any suitable means, such as machine screws (not shown).

Referring now to FIGS. 7 and 8, it can be seen that fluid capacitance 81, which is curved in shape, receives fluid flowing through tube 82 from aperture 20. The other end of capacitance 81 terminaates in a control nozzle 17 communicating with chamber 15 of amplifier A. A hollow rectangular tube 83 and a rectangular sleeve 84 slidable thereon communicate with capacitance 81 and connect capacitance 81 with the ambient or sump pressure which is generally lower than the maximum total pressure available at tube 82 during the operation cycle. Tube 83 and sleeve 84 provide means for producing a variable fluid inertance. Tube 83 and sleeve 84 are shown in detail in FIG. 9 and are similar in construction to tube 67 and sleeve 68 (FIG. 6).

Nozzle 16 is so positioned with respect to the centerline of chamber 15 that when fluid issues from power nozzle 16 (FIG. 7), a portion of the fluid flow goes to aperture 20 and therefore to tube 82 and output 122. As fluid flows through tube 82 into reservoir 81, a fluid pressure build-up develops therein. As the pressure build-up continues to develop in reservoir 81, control nozzle 17 will start to issue a deflecting stream of fluid. Fluid issuing from control nozzle 17 causes the main fluid stream of nozzle 16 to deflect towards aperture 20 so that substantially all of the fluid flows through tube 82 or through output tube 122. As the pressure in reservoir 81 increases, fluid in inertance tube 83–84 will start to flow at an increasing rate. After some predetermined time interval elapses, flow in inertance 83–84 will have reached a magnitude such that the pressure in reservoir 81 will pass through its maximum value and the fluid will be bled off from the reservoir through tube 83 at such a rate that the pressure in reservoir 81 drops below the pressure required to supply a control signal to nozzle 17 sufficient to maintain deflection of the power stream from nozzle 16 into aperture 20. Fluid in inertance 83–84 will be accelerated in the outflow direction so long as pressure in tank 81 exceeds the atmospheric or sump pressure into which the inertance discharges. Thus, the pressure in reservoir 81 will continue to cause an increase in flow in inertance 83–84 after the time of occurrence of maximum pressure. The inertia of fluid flow through inertance 83–84 will decrease pressure in capacitance 81 below the steady state value corresponding to the rate at which fluid is entering through tube 82 and then the flow in inertance 83–84 will stop discharging capacitance 81. Consequently, the main fluid stream will not be deflected. The fluid flow through amplifier A will then assume its initial flow pattern and flow into both apertures 19 and 20. Hollow sleeve 84 can be slid along tube 83 in the directions indicated by the arrows in FIG. 9 to tune the oscillator for oscillation at some predetermined frequency. Pressurized fluid is supplied to nozzle 16 through tube 50 (FIG. 8) from a suitable source of pressurized fluid.

It should be apparent that some portion of the fluid stream must flow into aperture 20 so that the reservoir 81 can receive fluid, if oscillation is to occur. Thus amplifier A must not be bistable in the absence of flow from control nozzle 17. In oscillator 104, fluid will issue from both output tubes 121 and 122 during the cycle, but there will always be flow through output tube 122. The quantity of fluid which issues from tube 122 will depend upon the amplifier A asymmetry and upon the time variant flow through control nozzle 17. Frequency of oscillation can be varied by variation of values for the fluid capacitance 81, the fluid inertance 88–89, nozzle 17, tube 82 and size of amplifier A.

As stated above, the oscillators of the instant invention may utilize compressible or incompressible fluids. In the case of the latter, the fluid capacitances may consist of an elastically deformable material, such as rubber.

Figure 10:
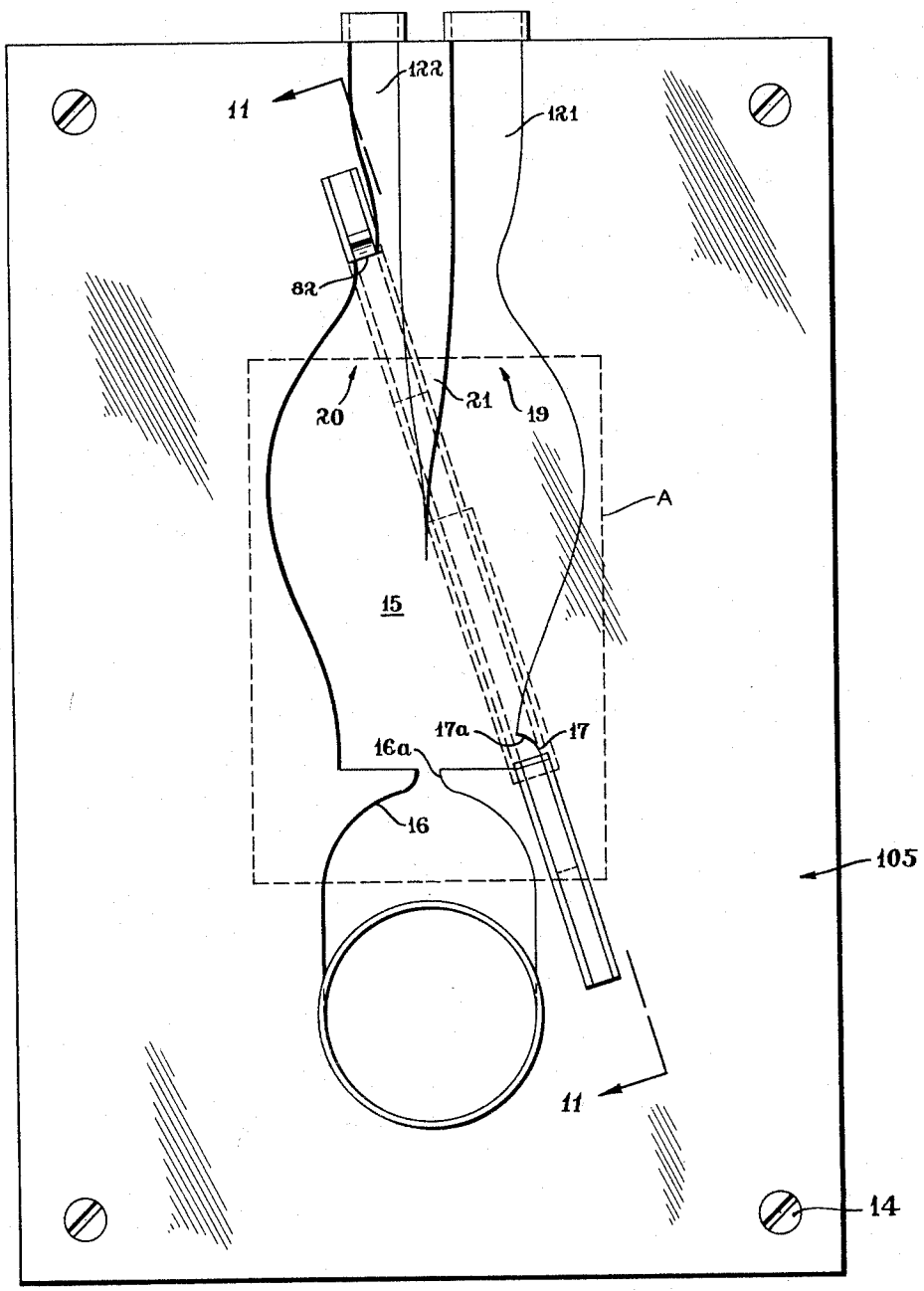
FIG. 10 is a plan view of another embodiment of a fluid oscillator constructed in accordance with this invention.
Figure 11:
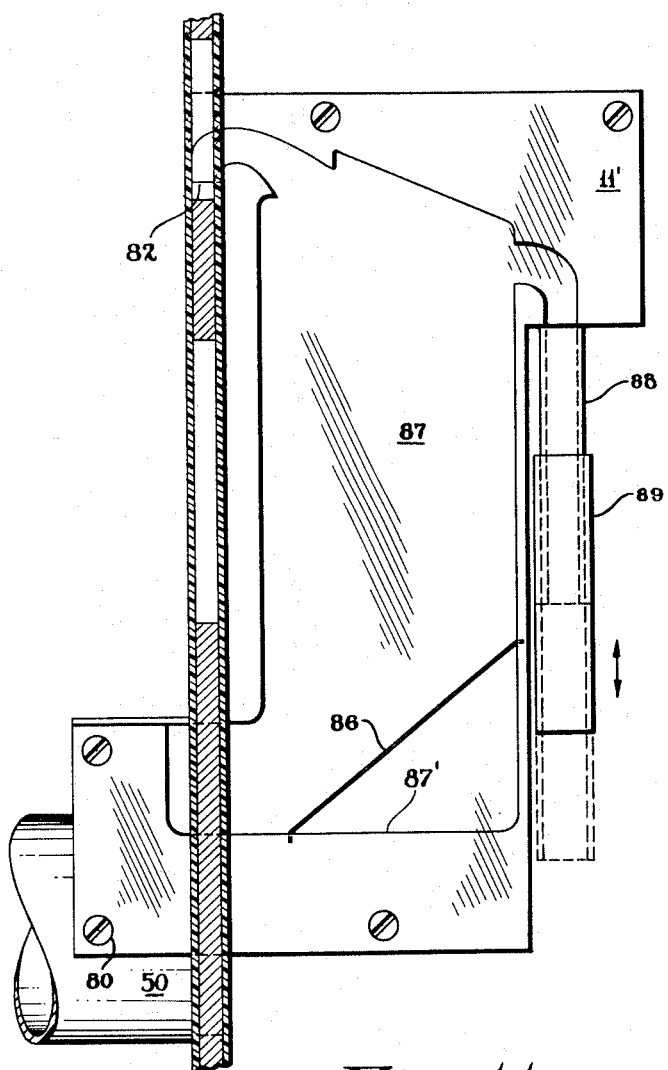
FIG. 11 is a sectional side view of FIG. 10 taken through section lines 11—11.

Oscillator 105, shown in FIGS. 10 and 11, is similar in construction to oscillator 104 and operates in the same manner but with incompressible fluids, such as liquids. Oscillator 104 is designed to function with compressible fluids, such as a gas. The similarity of operation in oscillator 104 is accomplished by providing a flexible diaphragm 86 (FIG. 11) in the fluid capacitance or reservoir 87, as shown. This combination of flexible diaphragm 86 and chamber 87 in FIG. 11 serves the same function as capacitance 81 of FIG. 8. The periphery of the rectangular diaphragm 86 is sealed to the walls of the reservoir 87 by any suitable adhesive means. Diaphragm 86 is capable of elastically deforming under the influence of liquid pressure in reservoir 87. While reservoir 87 is shown as substantially rectangular in shape, it should be evident that spherical, square, or other suitably shaped reservoirs may also be used. Region 87' of reservoir 87 is filled with a compressible fluid at suitable pressure.

Variable length fluid inertance tube 88 communicates with reservoir 87 in the same manner and for the same reason that fluid inertance tube 83 communicates with reservoir 81 in oscillator 104. Sleeve 89 can be slid on tube 88 so as to tune oscillator 105 to a predetermined oscillating frequency. Inertance 88–89 connects reservoir 87 with the ambient or sump pressure which is lower than the maximum total pressure which occurs at tube 82 during the cycle. Energy storage in the fluid capacitance in this case is by deformation of elastic diaphragm 86 or by compression of compressible fluid in volume 87'.

Figure 12:
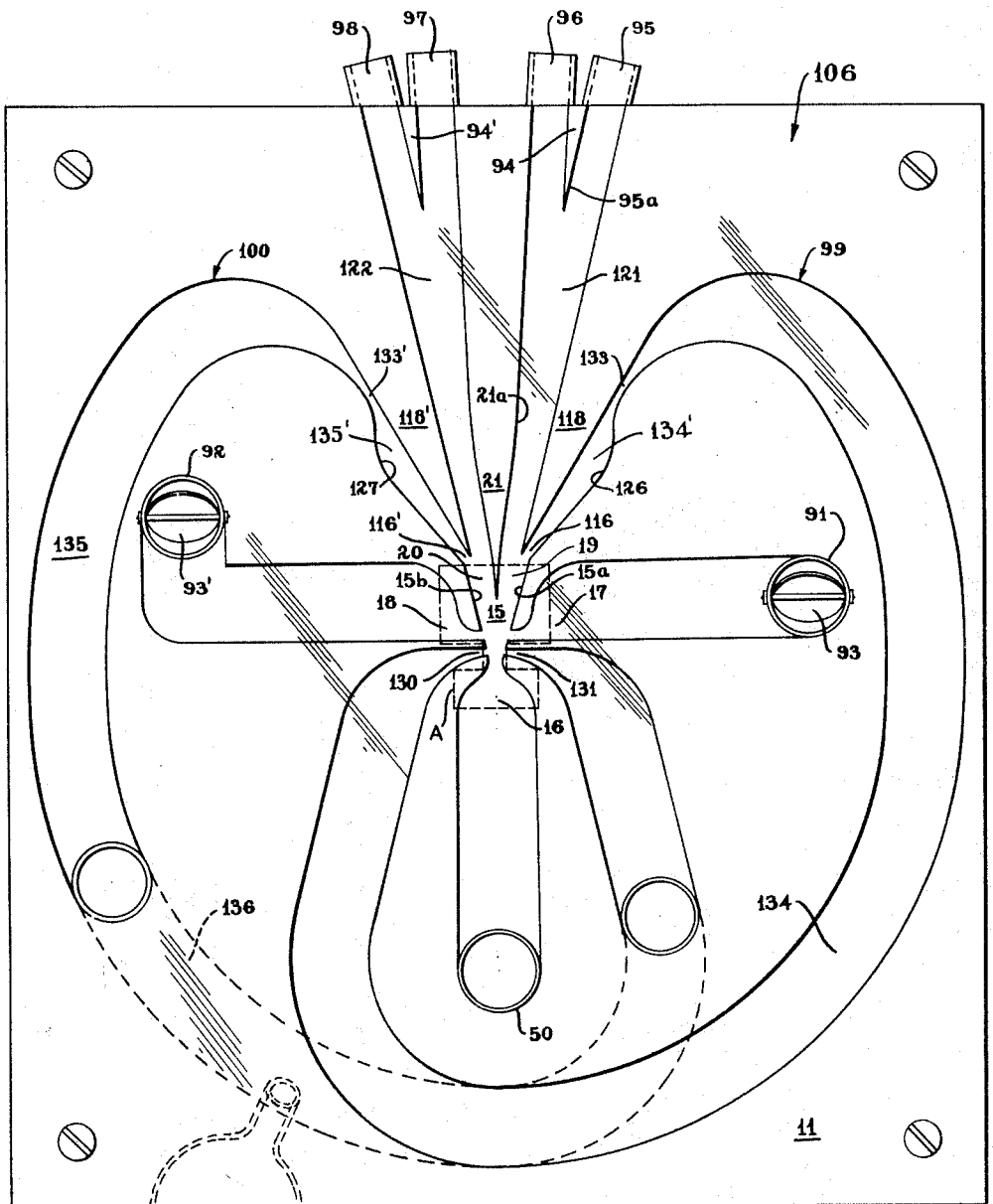
FIG. 12 is a plan view of an ultralow frequency fluid oscillator constructed in accordance with this invention.

FIGS. 12 and 12a illustrate another embodiment of a fluid oscillator designated by numeral 106 which is capable of providing ultralow frequency fluid oscillations. Referring now to FIG. 12a, tubes 50, 91 and 92 communicate with the supply nozzle 16 and control nozzles 17 and 18, respectively as shown in FIG. 12. Tube 50 is connected to any source of fluid under controlled pressure designated by numeral 90 and tubes 91 and 92 may also be connected to sources of fluid under pressure designated by numerals 90a and 90b. Valves 93 and 93' in tubes 91 and 92, respectively, provide means for varying fluid flow through these tubes.

Control nozzles 17 and 18 perform two important functions in oscillator 106. The first function is that, by issuing fluid from either or both of the control nozzles, it is possible to control or bias the tendency of the main fluid stream from supply nozzle 16 to lock-on to either chamber wall 15a or 15b. The second function of control nozzles 17 and 18 is to assure optimum operation of oscillator 106. The pressure of fluid issuing from supply nozzle 16 may be other than that pressure which provides optimum operation, that is, a predetermined number of oscillations or recurring changes in fluid flow per minute. By adjusting valves 93 and 93' it is possible to provide oscillations even though the pressure of fluid supplied nozzle 16 is not optimum for the design of the particular oscillator. If oscillator 106 is operating with optimum fluid pressure from supply nozzle 16, valves 93 and 93' could and should be turned so that they block tubes 91 and 92, thereby insuring that no fluid will be supplied by 90a or 90b to control nozzles 17 or 18, respectively.

Flow dividers 94 and 94' are provided in tubes 121 and 122 so that four output tubes 95, 96, 97 and 98 are formed at the output ends of tubes 121 and 122. Feedback tubes 99 and 100 provide feedback systems capable of storing fluid energy and releasing the energy periodically into amplifier A so as to cause oscillation of the power jet of nozzle 16. Constricted openings 116 and 116' are formed by the plates 11 and 13 and by leading edges of flow dividers 118 and 118' at the intersection of walls 15a and 15b and the side walls 126 and 127 of feedback tubes 99 and 100, respectively. Dividers 118 and 118' extend inwardly to the inclined plane of side walls of 15a and 15b, respectively. These dividers 118 and 118' will scoop a predetermined portion of the fluid flow over the associated wall 15a or 15b into opening 116 or 116', and hence into feedback tube 99 or 100, respectively.

Constricted orifices 130 and 131 in the opposite nozzle-shaped ends of feedback tubes 99 and 100 form apertures in opposite walls 15b and 15a, respectively. The function of orifices 130 and 131 will be disclosed in detail hereafter.

Three pairs of constrictions are formed in each feedback tube 99 and 100. These constrictions form fluid resistances because they limit fluid flow through the feedback tubes and cause fluid pressure drops therein. The first pair of fluid resistances is formed by constricted openings 116 and 116', the second pair by constricted orifices 130 and 131, and the third pair by constricted apertures 133 and 133'. Each pair of fluid resistances form between them a pair of fluid capacitances 134, 134' and 135, 135' which store fluid energy as potential energy. Fluid capacitance 134 comprises almost the entire length of tube 99, while capacitance 134' is a short section of tube 99. Fluid capacitance 135 comprises a substantial length of tube 100, sleeve 136 which joins the ends of tube 100, and tank 137. Capacitance 135' is a short section of tube 100. Tank 137 communicates with sleeve 136 and receives fluid entering tube 100.

In order to more fully understand the operation of oscillator 106 and the function of each feedback tube, assume that the main fluid stream issues from supply nozzle 16 and flows over chamber wall 15a to aperture 19 as a result of asymmetrical flow from nozzle 16. As should be evident, the power jet of nozzle 16 can be biased towards either chamber wall by fluid flow from either control nozzle 17 or 18.

Since divider 118 extends inwardly of the plane of wall 15a, it will scoop into opening 116 and hence into feedback tube 99 a predetermined portion of the main fluid stream issuing from nozzle 16, the remaining portion entering output tube 121 or aperture 20. Opening 116 is slightly larger in size than restriction 133 and orifice 130 and receives the fluid stream while the stream possesses considerable kinetic energy. Thus, the pressure in the capacitance 134' portion of tube 99 will rise to a value higher than the pressure in fluid capacitance 134, and as more fluid flows into the opening 116 the pressure therein builds up and more fluid flows through constricted aperture 133 and into reservoir 134.

The pressure build-up in capacitance 134 will be delayed relative to the pressure build-up in capacitance 134'. However, the pressure in capacitance 134 is soon large enough to cause orifice 130 to issue a fluid stream into chamber 15, forcing the power stream more strongly towards wall 15a. As pressure increases in 134, the back pressure in restriction 133 increases and the pressure in capacitance 134' also increases.

The pressure build-up in reservoir 134' will continue as long as fluid flows into opening 116 at a greater rate than it flows out through restriction 133. After a predetermined time, depending upon the size of the reservoirs and the constrictions, as well as the velocity of the power stream, the pressure in reservoir 134' will approach the local total pressure produced by the fluid stream entering opening 116. As a result, the boundary layer pressure along wall 15a will increase and finally overpower the effect of the control stream from nozzle 130, and will deflect the power stream away from wall 15a so that the power stream no longer flows into opening 116. This deflection lowers the pressure in opening 116 below the pressure of fluid in reservoir 134'. Fluid will thereupon issue from opening 116 and pass into the boundary layer between the main stream and the chamber wall 15a of fluid amplifier A. Fluid so issuing modifies the boundary layer along wall 15a and thereafter continues to deflect the power stream away from wall 15a and towards divider wall 21a and wall 15b by an amount which depends upon the pressure of the fluid issuing from opening 116. This action decreases the flow through output tube 95.

The deflection of the fluid stream from wall 15a toward wall 15b and from tube 95 into tube 96, 97 or 98 results in divider 118' scooping an increased amount of fluid into opening 116'. This fluid causes pressure build-up in fluid capacitances 135', 135 and 137 and causes orifice 131 to issue fluid into the boundary layer between the main fluid stream and chamber wall 15a. Deflection of the stream towards wall 15b will result. Concurrently, the amount of fluid scooped by divider 118' into reservoir 135' will increase.

Figure 13:
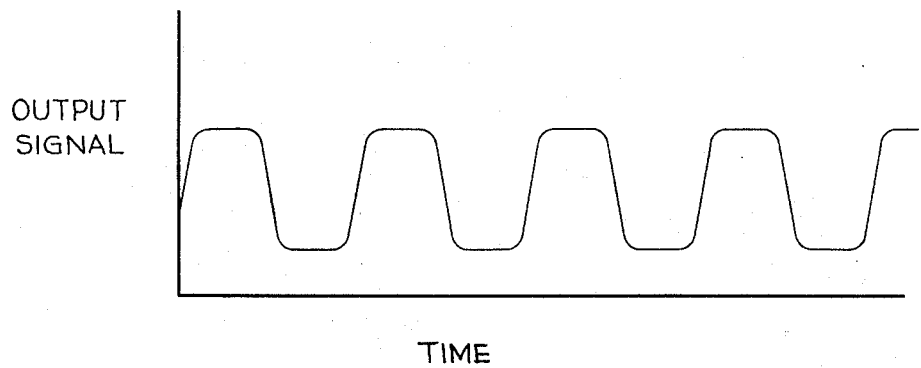

Opening 116' is larger than the constricted aperture 133 formed by the tube walls and is also larger than the aperture provided by orifice 131. Opening 116' is substantially the same size as opening 116. The cycle described above with regard to the operation of feedback tube 99 also applies to the operation of feedback tube 100. This results in an oscillation of flow rate to output tubes 121 and 122. There is also an oscillation of flow rate to tubes 95 and 96 and an oscillation of flow rate to tubes 97 and 98. Thus, one can use tubes 95 and 96, tubes 97 and 98, or tubes 121 and 122 as a push-pull output to control a fluid amplifier. When the respective fluid capacitances have substantially the same volume and when the tube constrictions are substantially the same size, a substantially symmetrical square wave of fluid flow, as shown in FIG. 13, will be produced by the fluid stream issuing from the desired pair of output tubes 121 and 122, tubes 97 and 98, or tubes 95 and 96. The other factors determining the particular oscillation characteristics include the power nozzle supply pressure, the relative boundary layer control effects of the fluid flowing from openings 116 and 116' and from orifices 130 and 131, and the fluid flow from the control nozzles 17 and 18, if used. Once the oscillator 106 starts to oscillate, neither control nozzle need be used unless, as stated above, optimum operating conditions are not present.

Figure 14:
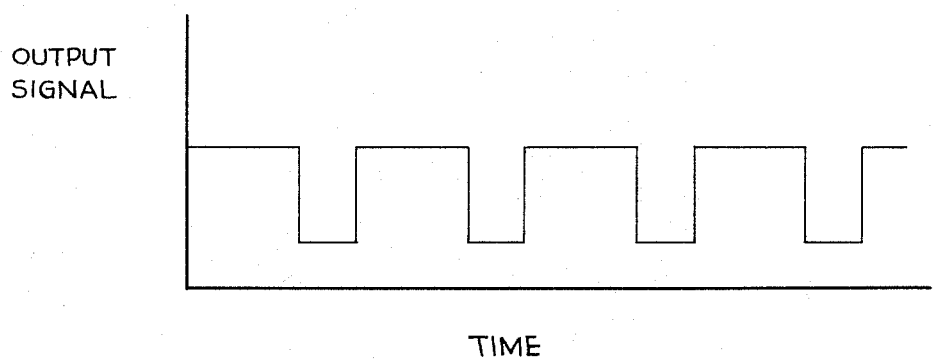
FIG. 14 illustrates an output signal produced by an oscillator constructed in accordance with this invention, such as shown in FIG. 12, in combination with a fluid multistable memory system, as shown in FIG. 15.
Figure 15:
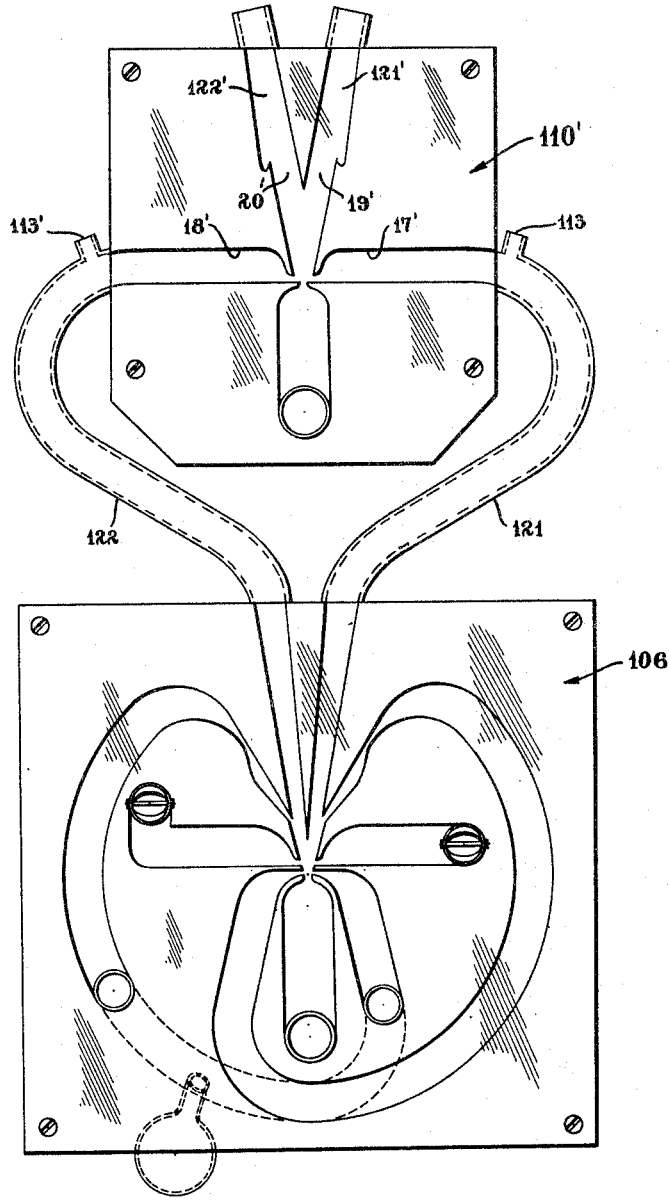
FIG. 15 illustrates how the oscillating output of an oscillator of this invention can be connected to a fluid multistable memory system to effect amplification of this output and increased sharpness of an output signal.

FIG. 14 illustrates the square wave form of the output signal which can be produced by any of the oscillators of this invention by merely driving a boundary layer lock-on type fluid amplifier as a flip-flop using the oscillator output as a push-pull control signal, as shown in FIG. 15.

FIG. 15 illustrates the use of oscillator 106 in combination with the fluid multistable memory system disclosed in the previously mentioned patent application of Romald E. Bowles and Raymond W. Warren, Serial No. 4,830, filed January 26, 1960. The fluid multistable memory system is referred to by numeral 110' and the output tubes 121 and 122 from oscillator 106 are connected to the control nozzles 17' and 18' of the multistable memory system. Since the memory system has the characteristic of persisting in trying to exhaust into that aperture 19' or 20' toward which it was last directed by fluid flow from one of the control nozzles 17' or 18', even after the control fluid flow ceases, it is possible to insure that the flow from either one of the tubes 121' or 122' will be as initially commanded by the output signal from oscillator 106. Any conventional fluid flip-flop (not shown) can be driven by the output signal from tubes 121' and 122' of the multistable memory system 110'. Porous plugs 113 and 113' are connected to tubes 121 and 122 in order to match the load to the oscillator output.

FIG. 16 illustrates another possible means whereby the oscillating fluid issuing from any of the oscillators disclosed above can be utilized. As shown in this figure, a grooved roller 140 carrying a foraminous belt 141 can be made to oscillate in the directions indicated by arrows D—D by oscillating fluid streams from any oscillator constructed in accordance with this invention impinging upon discs 142 and 143 which are fixed to the drive shaft 144 of roller 140. Belt 141 will sift sand or other granular material deposited thereon.

In general, the optimum supply pressure for the fluid oscillators disclosed above will primarily depend upon the size and configuration of the chamber 15, the size of the fluid resistances, the volumes and configuration of the reservoirs and the tanks, the fluid used, the length and diameter of the tubes used for providing fluid inertance, and the frequency of oscillation desired.

When fluid capacitances are the sole energy storage elements in a fluid oscillator, they can be used in conjunction with fluid resistances in the form of constrictions or porous plugs to achieve proper phasing of fluid fed back to the amplifier. When inertances alone are used to store energy, they can be used with fluid resistances to achieve proper phasing for oscillation. When both capacitance and inertance elements are used, the frequency of oscillation depends upon the resonant frequency of the combination, or it depends on the time delay around the feedback loop.

In general, the path through which the stored energy controls the flow of energy in the fluid amplifier can consist of a simple tube or various combinations of capacitances and resistances arranged so that some of the stored fluid energy is delivered to the fluid amplifier with the proper timing to cause oscillations. This path can consist of series, parallel or series-parallel connections of inertances, fluid capacitances and fluid resistances. It can also consist of repeated ladder-type connections of these elements.

The oscillation frequency of embodiments of this invention can be changed by changing the size and configuration of the feedback path and the fluid energy storage means. For example, the frequency of oscillation can be reduced by increasing the volume of the feedback system fluid capacitance. The oscillators of this invention can be designed to produce a considerable range of output signals from ultralow to supersonic frequencies, depending upon the relative sizes of the various elements forming the oscillators, as will be evident to those skilled in the art.

Since the fluid oscillators disclosed above can produce ultrasonic fluid oscillations, they can be used to oscillate a detergent solution in order to clean the surfaces of steel, porcelain or other materials immersed in the solution.

Other uses of these oscillators will, of course, be apparent to those skilled in the art.

It will be apparent that the embodiments shown are only exemplary and that various modifications can be made in construction and arrangement within the scope of the invention as defined in the appended claims.

We claim as our invention:

1. A fluid oscillator in which there are no moving parts other than the moving fluid, comprising a pure fluid amplifier, means supplying fluid energy to said amplifier, and means for storing fluid energy constructed and arranged so as to receive, store and feed back a portion of said fluid to said amplifier in phase with the desired oscillating output signal from said oscillator.

2. The fluid oscillator as claimed in claim 1, wherein said means for storing energy comprises a fluid capacitance.

3. The fluid oscillator as claimed in claim 1, wherein said means for storing energy comprises a fluid inertance.

4. The combination according to claim 1 wherein said means for storing comprises fluid capacitance and fluid inertance.

5. A fluid oscillator in which all the elements comprising said oscillator are stationary during operation thereof, comprising means for issuing a quantity of fluid into said oscillator, one portion of the main stream bein constricted, fluid conveying means having one end positioned so as to receive fluid from one side of said main stream, the other end of said conveying means positioned adjacent the constricted portion of said main stream so as to issue a portion of said fluid so received against the other side of said main stream, said portion of fluid so issuing from said other end causing said main fluid stream to bias towards said one end, and fluid storage means communicating with said conveying means and storing the remaining quantity of fluid received therefrom until a predetermined pressure builds up in said storage means, whereupon said fluid stream is partially diverted permitting fluid to issue from said one end at a pressure sufficient to cause deflection of said main stream against the bias produced by fluid issuing from said other end.

6. A fluid oscillator for generating an oscillating fluid stream, comprising a pair of surfaces upon which fluid can flow, means issuing a stream of fluid onto said surfaces, said stream and each surface coacting so that an artificial boundary layer is created between the stream and the surface over which said stream is flowing, said boundary layer causing said stream to lock on said surface, a pair of fluid feedback tubes associated with said pair of surfaces, each tube including: means for storing fluid under pressure and means for restricting fluid flow therefrom, each means for storing fluid communicating with a different one of said pair of surfaces and receiving fluid therefrom for a predetermined time until a predetermined fluid pressure is developed in said means for storing fluid, whereupon said means for storing fluid issues fluid into said boundary layer causing deflection of said stream between said surfaces; and means communicating with each of said pair of fluid feedback tubes and adapted to issue fluid between said stream and a surface opposite to that surface from which said feedback tube receives fluid so as to deflect said stream towards the other surface.

7. A fluid oscillator for generating an oscillating fluid stream, comprising a pair of surfaces upon which fluid can flow, means issuing a stream of fluid onto said surfaces, said stream and each surface coacting so that an artificial boundary layer is created between the stream and one surface over which said stream flows, said boundary layer causing said stream to lock on said one surface, a pair of fluid feedback systems, each system comprising: a tube having one end communicating with said surface and positioned to receive a portion of said fluid stream flowing thereover, a pair of constrictions formed in said tube, a fluid reservoir formed between said pair of constrictions, said constrictions limiting the rate of fluid flow from said reservoir and creating a pressure increase therein, said pressure increase continuing for a predetermined time until the pressure at said one end of said tube approaches the total pressure produced by said stream, whereupon said reservoir issues fluid through said one end of said tube into said boundary layer sufficient to cause deflection of said stream; and means actuated by said deflected stream.

8. An ultralow frequency oscillator for generating an oscillating fluid stream, comprising a pair of opposed diverging walls, a supply nozzle for issuing a main stream of fluid therebetween, each of said walls creating an artificial boundary layer between itself and said main stream flowing thereover, a pair of substantially hollow tubes each having two constricted ends, one end positoned to receive a portion of said stream flowing over one wall of said pair, a plurality of fluid-receiving apertures adjacent said one end of said tube, one aperture receiving the remaining portion of said stream, the other end of each tube being constricted and positioned so as to issue fluid from an opposite wall adjacent said supply nozzle whereby fluid issuing from the other tube end deflects said main stream against said one wall, the constricted ends of each tube limiting the rate of fluid flow therefrom and creating a pressure increase in said tube, said pressure increase continuing for a predetermined time until the pressure at said one end of said tube approaches the pressure produced by said stream, whereupon said tube issues fluid through said one end into said boundary layer sufficient to cause movement of said main stream to said opposite wall and deflection of said main stream from said one aperture to another in an oscillating manner.

9. An ultralow frequency oscillator for generating an oscillating fluid stream, comprising a pair of opposed diverging walls, a supply nozzle for issuing a main stream of fluid between said walls, each of said walls creating an artificial boundary layer between itself and said main stream, a pair of hollow tubes each having two ends, one end positioned to receive a portion of said stream flowing over one of said walls, a plurality of fluid-receiving apertures, one aperture receiving the remaining portion of said stream, the other end of each tube being constricted and positioned so as to issue fluid from an opposite wall of said pair adjacent said supply nozzle whereby fluid issuing from said other end deflects said main stream against said one of said walls, the constricted end of each tube limiting the rate of fluid flow therefrom and causing a pressure increase in said tube, said pressure increase continuing for a predetermined time until the pressure at said one end approaches the pressure produced by said main stream, whereupon said tube issues fluid through said one end into said boundary layer sufficient to cause movement of said main stream to said opposite wall and from said one aperture to another in an oscillating manner, and means actuated by movement of said main stream from said one aperture to another.

10. An ultralow frequency oscillator for generating an oscillating fluid stream, comprising a pair of opposed diverging walls, a supply nozzle for issuing a main stream of fluid between said walls, each of said walls creating an artificial boundary layer between itself and said main stream flowing thereover, a pair of substantially hollow tubes each having two ends, one end positioned adjacent said boundary layer to receive a portion of said main stream from one of said walls, a plurality of fluid-receiving apertures, one aperture adjacent said one end of said tube for receiving the remaining portion of said main stream, the other end of each tube being constricted and positioned in an opposite wall so as to issue fluid against said main stream as said main stream issues from said supply nozzle, a second constriction formed in each tube, the constricted end of each tube and said second constriction cooperating so as to limit the rate of fluid flow from either end of said tube and causing a pressure increase in said tube, said pressure increase continuing for a predetermined time until the pressure at said one end approaches the pressure produced by said main stream, whereupon said tube discharges fluid through said one end into said boundary layer sufficient to deflect said main stream against said opposite wall and from said one fluid-receiving aperture to another.

11. An ultralow frequency oscillator for generating an oscillating fluid stream, comprising a chamber having a pair of opposite walls, a supply nozzle having an orifice through which a main stream of fluid can issue into one end of said chamber, said orifice forming an aperture in said one end of said chamber, each of said opposite walls diverging and being spaced from said aperture, each wall thereby creating an artificial boundary layer between said main stream and one wall of said pair, a pair of tubes for feeding back fluid into said chamber, a constricted opening at one end of each tube partially formed by the diverging extremities of said pair of said opposite walls so that each tube can alternately receive a portion of said main stream alternately flowing along one wall of said pair, a pair of fluid-receiving apertures at the other end of said chamber, one aperture receiving the remaining portion of said fluid stream, the other end of each tube having a constricted orifice at the extremity thereof which forms an aperture in a wall of said pair of walls opposite said one wall, the constricted orifice being positioned adjacent said one end of said chamber so that fluid issuing from either tube deflects said main stream against an opposite wall, said constricted orifices limiting the rate of fluid discharge and thereby causing a pressure increase in the tube, said pressure increase continuing for a predetermined time until the pressure at the tube opening approaches the pressure produced by a portion of the main stream entering said opening, whereupon said tube discharges fluid through said opening into said boundary layer sufficient to cause movement of said main stream towards an opposite chamber wall and movement of said main stream to another aperture of said pair, and means actuated by oscillations of said main stream between said fluid-receiving apertures.

12. A fluid oscillator for generating an oscillating output signal in which all structural elements remain stationary during operation thereof, comprising a fluid amplifier having opposed surfaces upon which a stream of fluid can flow, and feedback means positioned to intercept a part of said stream, said feedback means feeding back fluid received thereby between the stream and at least one of the surfaces at periodic phase intervals and with a magnitude sufficient to deflect said stream towards an opposite surface.

13. The fluid oscillator as claimed in claim 12, wherein said feedback means includes means for storing fluid energy in the form of potential energy.

14. The fluid oscillator as claimed in claim 12, wherein said feedback means includes means for storing fluid energy in the form of kinetic energy.

15. The fluid oscillator as claimed in claim 12, wherein said feedback means includes means for storing fluid energy in the form of potential energy and kinetic energy.

16. A fluid oscillator for generating an oscillating signal in which all structural elements remain stationary during operation thereof, comprising opposed surfaces capable of supporting fluid flow thereon, means for issuing a fluid stream between said surfaces, said surfaces being set back and diverging from said means so that said stream can lock on to either surface nozzle means communicating with said surfaces for issuing fluid between said stream and said surfaces, and feedback means connected to said nozzle means and positioned to intercept a part of said stream, said feedback means issuing fluid at periodic phased intervals between said stream and one surface sufficient to deflect a major portion of said stream towards an opposed surface.

17. A fluid oscillator in which all structural elements remain stationary during operation thereof comprising: means for issuing a stream of fluid, at least one surface positioned to receive and guide said stream of fluid, control means adapted to establish a pressure gradient across said stream so as to vary the quantity of fluid re-received by said surface, and feedback means positioned to intercept a part of said stream flowing over said surface, said feedback means feeding back fluid received thereby so as to decrease the pressure gradient established by said control means, and being constructed such that fluid is fed back to deflect said stream towards another surface at predetermined periodic intervals.

18. The fluid-operated system as claimed in claim 17, wherein said stream of fluid is confined to the plane of deflection of said stream.

19. The fluid oscillator as claimed in claim 17, wherein said feedback means includes means for storing fluid energy in the form of potential energy.

20. The fluid oscillator as claimed in claim 17, wherein said feedback means includes means for storing fluid energy in the form of kinetic energy.

21. The fluid oscillator as claimed in claim 17, wherein said feedback means includes means for storing fluid energy in the form of potential energy and in the form of kinetic energy.

22. A fluid oscillator in which all structural elements remain stationary during operation thereof comprising: a pair of opposed surfaces capable of supporting fluid flow thereupon, means issuing a fluid stream between said surfaces, said surfaces diverging from said stream so issued so that said stream can lock on to either surface, nozzles for issuing fluid between said stream and said surfaces for deflecting said stream between said surfaces and feedback means connected to said nozzles and positioned to intercept a part of said stream as it flows over one surface of said pair, said feedback means feeding back fluid received thereby at periodic phased intervals between said stream and said surfaces, said feedback means being proportioned such that the quantity of fluid fed back is sufficient to deflect a major proportion of said stream towards and against the other surfaces of said pair.

23. A fluid oscillator in which all structural elements remain stationary during operation thereof comprising: at least one surface positioned to receive and guide said stream of fluid, and feedback means positioned to intercept a part of said stream flowing over said surface, control means connected to said feedback means to establish a pressure gradient, said feedback means feeding back fluid received thereby so as to decrease the pressure gradient established by said control means and being constructed such that fluid is fed back to deflect said stream towards another surface at predetermined periodic intervals.

24. A fluid oscillator, comprising means for establishing a fluid stream, a boundary layer generating aerodynamic surface, means including said aerodynamic surface normally directing said stream in a first direction, and means responsive to said stream when directed in said first direction for directing said stream in another direction.

25. The combination according to claim 24 comprising further means responsive to flow of said stream in said another direction to redirect the stream in said first direction.

26. A fluid oscillator, comprising means for establishing a fluid stream, and further means responsive to said fluid stream for deflecting said fluid stream periodically in alternation in different directions, said further means including means for storing fluid of the deflected stream and directing the stored fluid against said stream.

27. The combination according to claim 26 wherein said further means includes at least one output channel, said output channel communicating with said means for storing fluid.

28. The combination according to claim 27 further comprising means for varying the capacity of said storage means to vary the frequency of oscillation.

29. The combination according to claim 27 wherein said further means further comprises a fluid amplifier positioned between said output channel and said storage means.

30. The combination according to claim 27 wherein said further means further comprises means for biasing said fluid stream toward said one output channel, said stored fluid being directed to the side of the stream toward which said stream is biased.

31. The combination according to claim 30 wherein said means for biasing comprises a wall located sufficiently close to said stream of fluid to establish boundary layer effects therebetween.

32. The combination according to claim 30 further comprising a pure fluid amplifier having a pair of output passages positioned to receive said stream in alternation, a divider defining adjacent walls of said passages, said means for biasing comprising asymmetrical location of said divider relative to said means for establishing a fluid stream, the asymmetry of said divider being such as to cause said stream to normally flow to one of said output passages, said further means communicating with said one output passage.

33. The combination according to claim 32 further comprising means for varying the capacity of said storage means to vary the frequency of oscillation.

34. A fluid oscillator, comprising means for establishing flow of said fluid alternately directable in at least two different directions and further means responsive to said flow when directed in either one of said directions for directing said flow in the other of said directions, one of said further means including an aerodynamic surface positioned to cause a border layer to be developed between said fluid and said surface.

35. A fluid oscillator for producing an oscillating fluid stream, comprising a surface over which fluid can flow, means issuing a stream of fluid onto said surface, said stream and said surface coacting so that an artificial boundary layer is created between the stream and said surface, said boundary layer causing said stream to lock-on said surface and follow the contours thereof, means for storing fluid under pressure, said means for storing receiving fluid when said stream is locked onto said surface, said means for storing receiving fluid until a predetermined fluid pressure is developed therein, whereupon said means for storing issues a fluid stream into said boundary layer causing deflection of said stream from said surface and means for returning said stream to said surface after termination of flow from said means for storing.

36. A fluid oscillator for producing an oscillating output signal, comprising a pure fluid amplifier, means supplying fluid to said amplifier, fluid storage means for receiving fluid from said amplifier and means applying said fluid from said fluid storage means to said amplifier so that an oscillating output signal is produced by said amplifier.

37. A pure fluid device comprising means for establishing a fluid stream, a boundary-layer-generating, aerodynamic surface, means including said aerodynamic surface directing said stream in a first direction and, means responsive to said stream when directed in said first direction for directing said stream in another direction.

38. A fluid oscillator comprising opposed boundary layer surfaces, means for issuing a stream of fluid between said surfaces, a pair of output passages for receiving fluid from said stream in alternation, storage means each for receiving fluid from a different output passage, and means for issuing fluid from each storage means between the fluid stream and the boundary layer wall adjacent the output passage from which each storage means receives fluid.

References Cited by the Examiner

UNITED STATES PATENTS

| | | | |
|---|---|---|---|
| 2,408,705 | 10/46 | Todd. | |
| 2,550,723 | 5/51 | Ross. | |
| 2,755,767 | 7/56 | Levavasseur | 116—137 |
| 3,016,066 | 1/62 | Warren | 137—624.14 |
| 3,024,805 | 3/62 | Horton | 137—610 |
| 3,111,931 | 11/63 | Bodine | 235—61 |

LAVERNE D. GEIGER, *Primary Examiner.*

KARL J. ALBRECHT, *Examiners.*